(12) United States Patent
Nishiyama et al.

(10) Patent No.: US 7,362,922 B2
(45) Date of Patent: Apr. 22, 2008

(54) IMAGE DATABASE APPARATUS AND METHOD OF CONTROLLING OPERATION OF SAME

(75) Inventors: Akio Nishiyama, Asaka (JP); Arito Asai, Asaka (JP)

(73) Assignee: Fujifilm Corporation, Tokyo (JP)

( * ) Notice: Subject to any disclaimer, the term of this patent is extended or adjusted under 35 U.S.C. 154(b) by 736 days.

(21) Appl. No.: 10/310,935

(22) Filed: Dec. 6, 2002

(65) Prior Publication Data
US 2003/0113040 A1 Jun. 19, 2003

(30) Foreign Application Priority Data
Dec. 13, 2001 (JP) ............................. 2001-379397

(51) Int. Cl.
G06K 9/54 (2006.01)
H04N 5/76 (2006.01)
G06F 7/00 (2006.01)

(52) U.S. Cl. .................. 382/305; 348/231.2; 707/6
(58) Field of Classification Search ................ 382/190, 382/209, 217, 218, 224, 305; 348/231.2; 707/3, 5, 6, 104.1; 715/719
See application file for complete search history.

(56) References Cited

U.S. PATENT DOCUMENTS

| | | | | |
|---|---|---|---|---|
| 5,341,466 | A * | 8/1994 | Perlin et al. ................. | 382/301 |
| 5,821,945 | A * | 10/1998 | Yeo et al. .................... | 345/440 |
| 6,121,969 | A * | 9/2000 | Jain et al. .................... | 715/850 |
| 6,285,995 | B1 * | 9/2001 | Abdel-Mottaleb et al. ...... | 707/3 |
| 6,567,797 | B1 * | 5/2003 | Schuetze et al. ............... | 707/2 |

(Continued)

FOREIGN PATENT DOCUMENTS

JP 2000-242648 9/2000

(Continued)

OTHER PUBLICATIONS

Kobayashi et al. "Object Recognition based on 2-D Orthogonal Expansion of Imge", Technical Report of the Institute of Electronics, Information and Communication Engineers, Japan, The Institutie of Electronics, Information and Communications Engineers, vol. 99, No. 575, pp. 83-88 (2000).

(Continued)

*Primary Examiner*—Colin LaRose
(74) *Attorney, Agent, or Firm*—Birch, Stewart, Kolasch & Birch, LLP (57) ABSTRACT

Ten representative images are extracted from an image database storing images of a number of frames. The extracted representative images are displayed in a coordinate area, along the coordinate axes of which the image characteristics of the images are plotted, in a form in which the images are distributed in accordance with the image characteristics possessed by the extracted representative images. An image having characteristics resembling those of a required image is designated from among the representative images displayed. Images of ten frames having characteristics resembling those of the designated image are again displayed in distributed form in a coordinate area having image characteristics plotted along the coordinate axes thereof. The coordinate axes of the coordinate area displayed the second time are made more detailed than those of the coordinate area displayed the first time. As a result, images having slightly different characteristics are displayed in separated form, thereby making it easier to find the required image.

7 Claims, 5 Drawing Sheets

U.S. PATENT DOCUMENTS

| | | | |
|---|---|---|---|
| 6,804,420 B2 * | 10/2004 | Uehara et al. | 382/305 |
| 6,882,746 B1 * | 4/2005 | Naveen et al. | 382/173 |
| 6,948,124 B2 * | 9/2005 | Combs et al. | 715/712 |
| 6,996,782 B2 * | 2/2006 | Parker et al. | 715/764 |
| 7,023,446 B1 * | 4/2006 | Iwasaki | 345/581 |

FOREIGN PATENT DOCUMENTS

| | | |
|---|---|---|
| JP | 2000-305946 | 11/2000 |
| JP | 2001-256244 | 9/2001 |
| JP | 2001-273302 | 10/2001 |

OTHER PUBLICATIONS

Iwasaki et al. "Access Method for Huge Image Database", Report of Information Processing Society, Japan, Information Processing Society, Jul. 23, 1999, vol. 99, No. 61, pp. 43-48 (1999).

Yoshinori Musha et al., "A User Interface Visualizing Feature Space for Content-Based Image Retrieval", Technical Report of The Institute of Electronics, Information and Communication Engineers, Japan, The Institute of Electronics, Information and Communications Engineers, Jul. 24, 1998, vol. 98, No. 208, 141-148.

* cited by examiner

IMAGE DATABASE APPARATUS AND METHOD OF CONTROLLING OPERATION OF SAME

BACKGROUND OF THE INVENTION

1. Field of the Invention

This invention relates to an image database apparatus and to a method of controlling the operation of the database apparatus.

2. Description of the Related Art

There are a variety of types of image database apparatus available. In one example of such an apparatus, keywords corresponding to images are registered in advance. When an image search is performed, a keyword is entered, whereby the image corresponding to the keyword is found. With an image database of this kind, however, appropriate keywords are entered in accordance with the sought images and therefore a great deal of labor is involved.

In another example of an image database apparatus, an image is drawn using draw software and an image that resembles the drawn image is found by a search. However, drawing an image that resembles the sought image is not always easy. Finding a desired image is difficult.

SUMMARY OF THE INVENTION

Accordingly, an object of the present invention is to find a desired image with comparatively little labor.

According to the present invention, the foregoing object is attained by providing an image database apparatus comprising an extraction device (extraction means) for extracting representative image data, which represents representative images of a plurality of frames, from an image database in which image data of a number of frames has been stored; a first display control device for controlling a display device in such a manner that the representative images of the plurality of frames represented by the representative image data extracted by the extraction unit are displayed in a coordinate area in a form in which they are distributed in accordance with characteristics of each of the representative images; a designating device (designating means) for designating a desired image from among the images of the plurality of frames distributed in the coordinate area based upon display control performed by the first display control device; a search device (search means) for searching the image database for an image having characteristics that resemble the characteristics of the image designated by the designating device; and a second display control device for controlling the display device in such a manner that retrieved images, which result from the search performed by the search device, are displayed in the coordinate area in conformity with the characteristics thereof.

The present invention provides also an operation control method suited to the image database apparatus. Specifically, the method comprises the steps of: extracting representative image data, which represents representative images of a plurality of frames, from an image database in which image data of a number of frames has been stored; displaying the representative images of the plurality of frames represented by the extracted representative image data on a display device in a form in which the images are distributed in a coordinate area in accordance with characteristics of each of the representative images; designating an image of a desired frame from among the images of the plurality of frames distributed in the coordinate area; searching the image database for images having characteristics that resemble the characteristics of the image designated; and controlling the display device in such a manner that retrieved images, which result from the search, are displayed in the coordinate area in distributed form.

In accordance with the present invention, representative images (representative image data) of a plurality of frames are extracted from images (image data) of a number of frames that have been stored in an image database. The extracted representative images of the plurality of frames are displayed by being distributed in a coordinate area (also referred to as a coordinate plane in which the characteristics of images are placed along the coordinate axes, which may or may not be displayed) in accordance with the characteristics of each of the representative images (color characteristics, lightness characteristics, saturation characteristics and dates of photography of the representative images).

An image resembling a sought image (an image whose characteristics resemble those of the sought image) is designated by the user from among the plurality of representative images displayed in the coordinate area. Images (usually a plurality) having characteristics that resemble those of the designated image are searched from the image database, and the images retrieved by the search are displayed in the coordinate area.

Since representative images of a plurality of frames are displayed in the coordinate area in distributed form, an image resembling the image sought by the user can be readily ascertained visually. Designating the sought image is comparatively easy. When the image is designated, images of a plurality of frames having characteristics that resemble the characteristics of the image are displayed in the coordinate area. The sought image can be selected from the images that have been re-displayed.

Since the labor involved in entering a keyword suited to an image is unnecessary, less effort is required to create the image database. Further, since images of a plurality of frames are displayed and the sought image is selected from these images, the desired image can be found relatively simply as compared with the case where an image resembling the sought image is drawn and an image resembling the drawn image is found.

Preferably, the apparatus further includes a device for performing control so as to repeat the designating of images by the designating device, searching by the search device and display control by the second display control device.

It is preferred that at least one of the first and second display control devices controls the display device so as to display images, in conformity with the characteristics thereof, in a coordinate area that is formed over the entire surface of one window.

Since the coordinate area itself is formed over the entire surface of one window (display screen), the size of one frame of an image appears larger in comparison with a case where one window is split into multiple areas and the coordinate area is formed in one of these areas. A plurality of representative images and other images, etc., displayed in this coordinate area become easier to view.

By way of example, the extraction device extracts the representative image data from image data obtained by applying a KL (Karhunen-Loéve) expansion to image data representing images of a number of frames that have been stored in the image database.

Representative images represented by representative image data extracted by the extraction device are extracted randomly, by way of example.

Preferably, coordinates axes in the coordinate area in which images are displayed in accordance with their characteristics based upon display control by the second display control device are more detailed than coordinate axes in the coordinate area in which images are displayed by being distributed based upon display control by the first display control device.

Even if images of a plurality of frames displayed in distributed form based upon display control by the second display control device have similar characteristics, these images are displayed in a form separated from one another. This makes it easier to find the sought image.

The number of frames of representative images displayed in the coordinate area based upon display control by the first display control device and the number of frames of images displayed in the coordinate area based upon display control by the second display control device may be made the same.

Since the number of frames of images to be displayed will not change, images can be maintained in an easy-to-view state by setting the number of frames of images to be displayed to a suitable number.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described with reference to the drawings.

Figure 1:
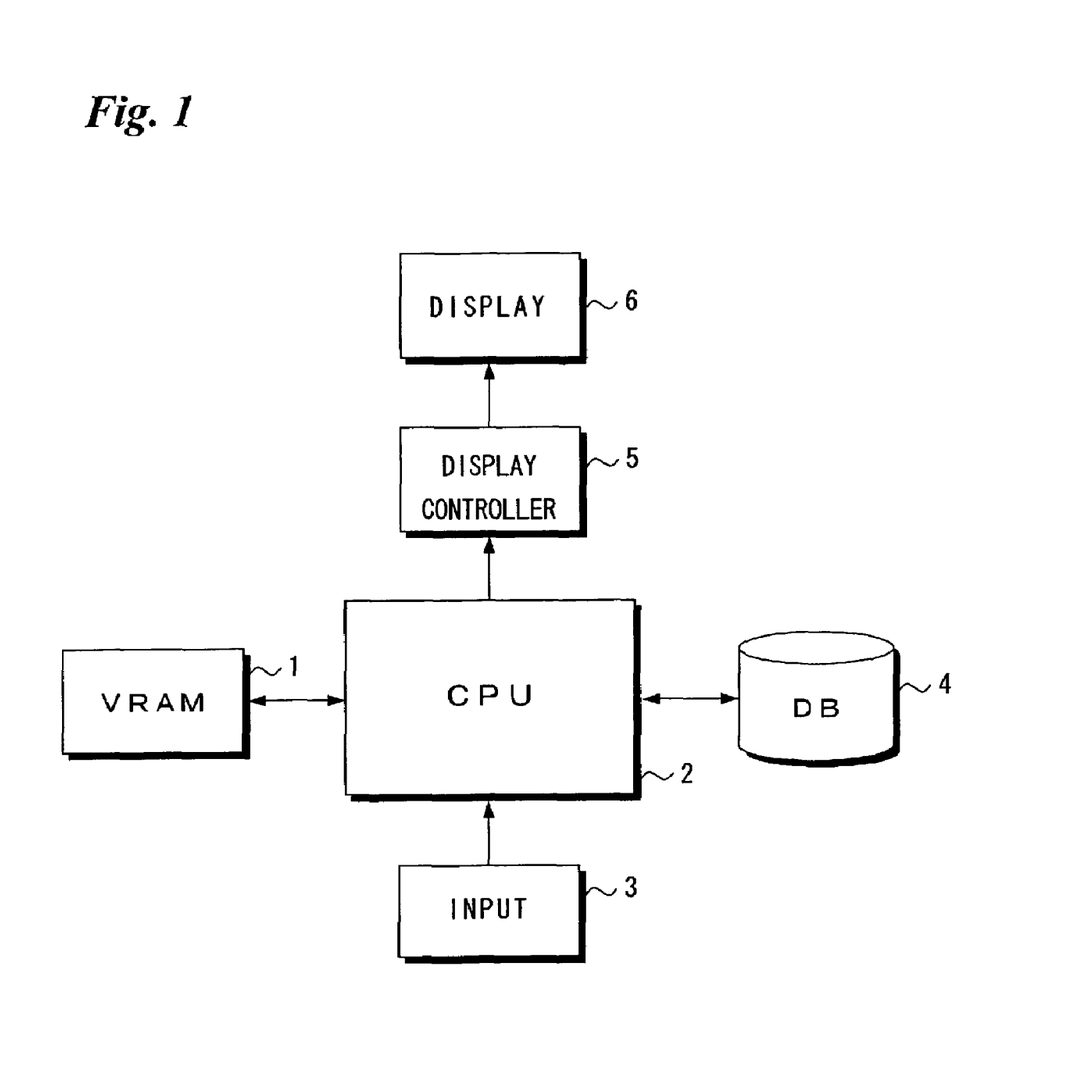
FIG. 1 is a block diagram illustrating the electrical structure of an image database apparatus according to the present invention.

FIG. 1 is a block diagram illustrating the electrical structure of an image database apparatus embodying the present invention.

The overall operation of the image database apparatus is controlled by a CPU 2.

The image database apparatus includes an image database 4 storing image data representing a number of color images (or monochrome images). Data representing the characteristics of the image data also is stored in the image database 4 in correspondence with the image data that has been stored. The characteristics of the image data include the percentage of color in an image, the average lightness of an image, the average saturation of an image and the date of photography of the image.

An output signal from an input unit 3 such as a keyboard or mouse is applied to the CPU 2. The input unit 3 outputs a signal representing an image search command, a signal indicative of the fact that a specific image has been designated, etc.

Also connected to the CPU 2 is a VRAM (Video Random-Access Memory) 1 for temporarily storing image data representing an image to be displayed on the display screen of a display unit 6. The display of an image on the display unit 6 is controlled by a display controller 5.

Figure 2:
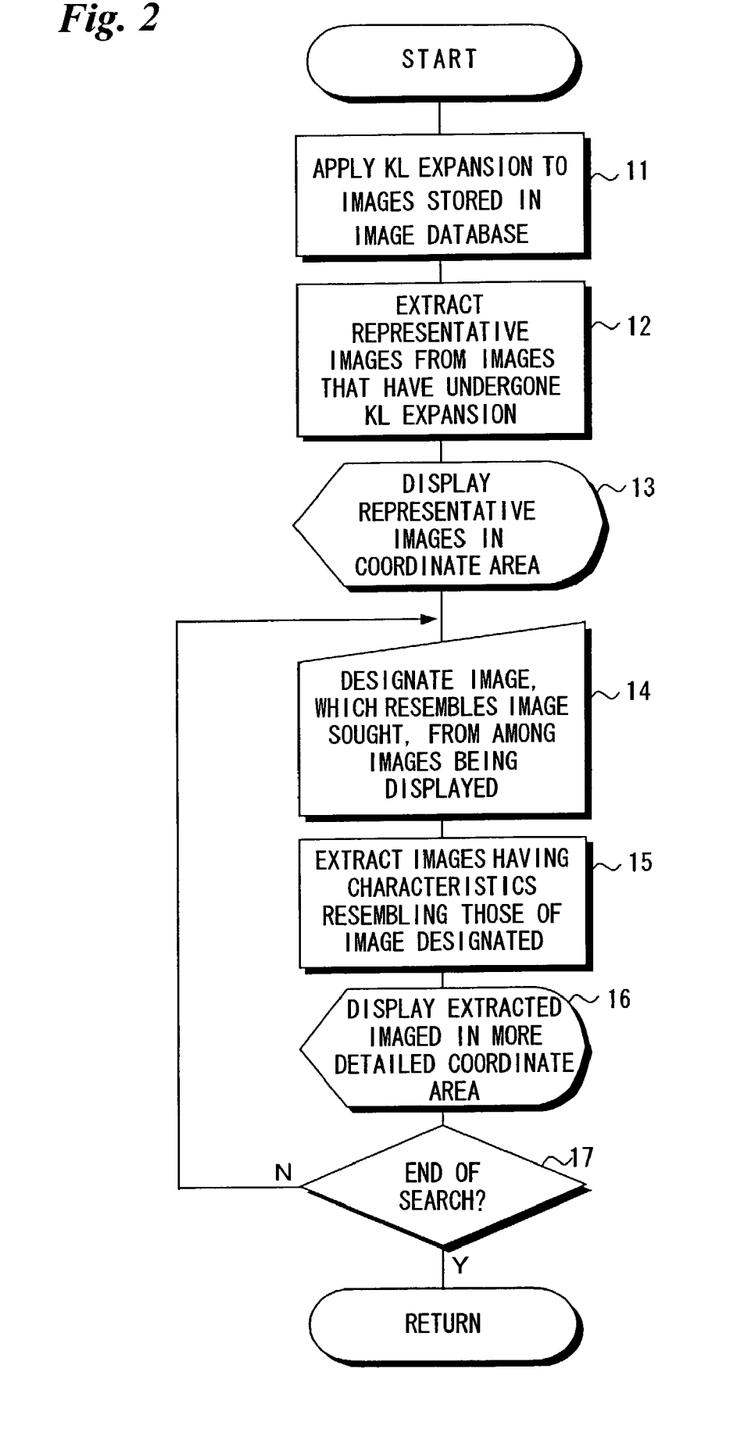
FIG. 2 is a flowchart illustrating processing executed by the image database apparatus.
Figure 3:
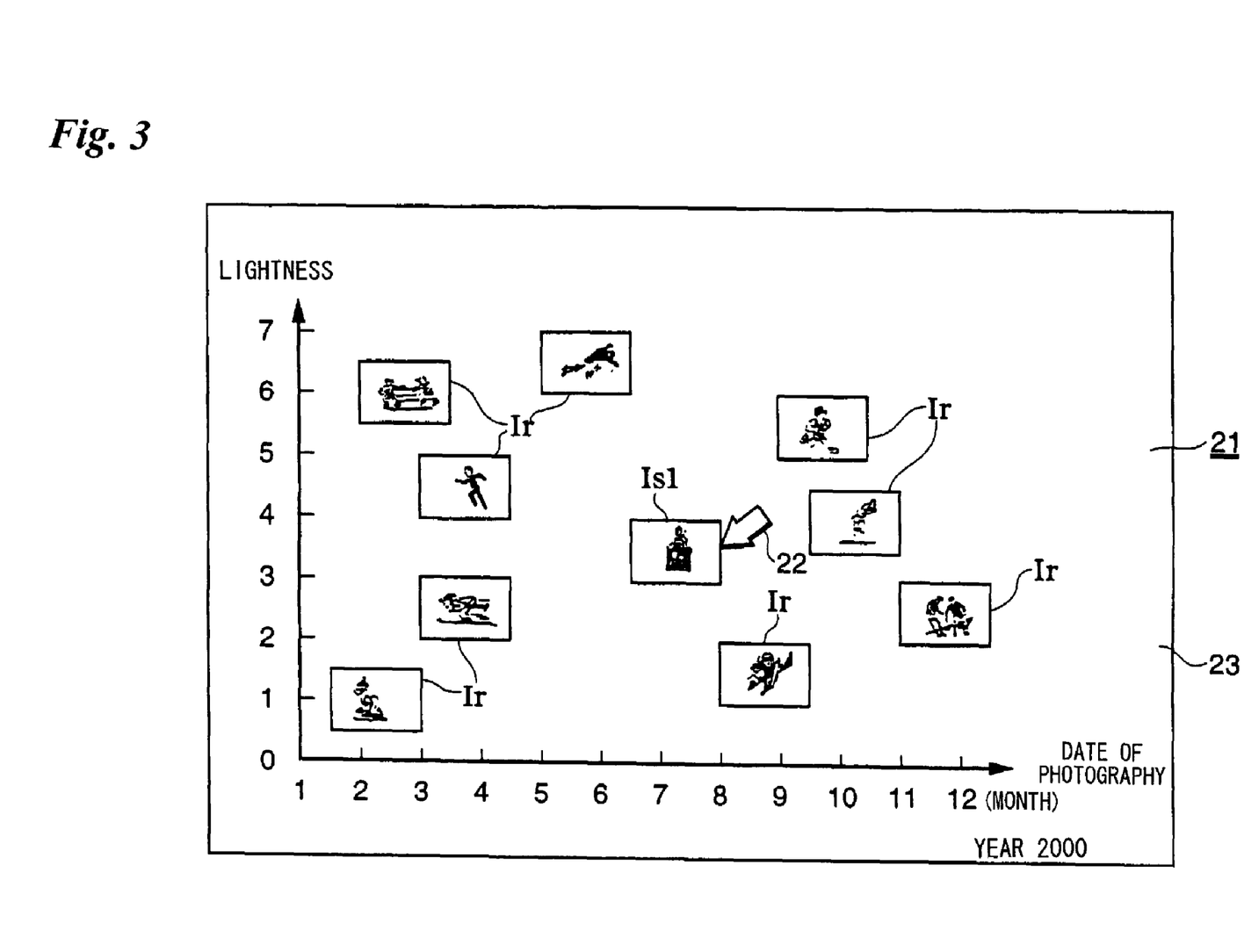
FIGS. 3 to 5 diagrams showing examples of images displayed on a display screen in accordance with the present invention.
Figure 4:
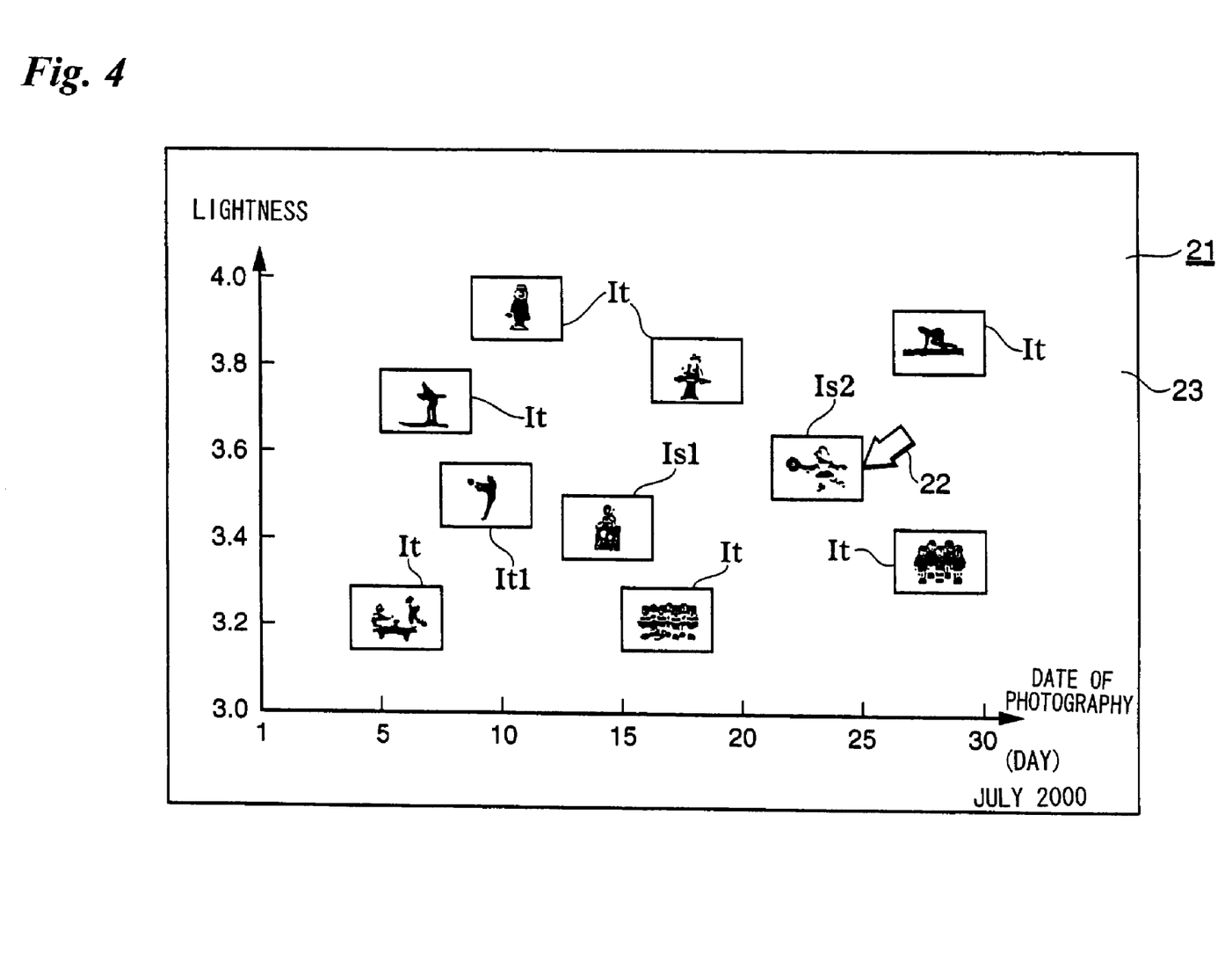

FIG. 2 is a flowchart illustrating processing executed by the image database apparatus, and FIGS. 3 and 4 are diagrams showing examples of images displayed on the display screen of the display unit 6.

The image database apparatus according to this embodiment is such that a plurality of images having different characteristics are displayed on the display screen of the display unit 6 as representative images from among the number of images that have been stored in the image database 4. An image resembling a sought image is designated by the user from among the plurality of representative images thus displayed. A plurality of images having characteristics close to those of the designated image are re-displayed on the display screen of the display unit 6. By repeating this processing, the required image is found by the user. Since the required image can be found from among images being displayed on the display screen of the display unit 6, the required image can be found in comparatively simple fashion. Other features of the image database apparatus according to this embodiment will become obvious from the description that follows.

As mentioned above, the image database apparatus according to this embodiment is such that a plurality of representative images are displayed on the display screen of the display unit 6. The representative images selected for this display have various characteristics. The representative images are displayed as follows, by way of example: Consider multidimensional space in which the image characteristics are placed along the coordinate axes. In such case the images are disposed in this multidimensional space. The distances and directions of respective ones of the images from the origin of this multidimensional space are calculated as feature vectors. Representative images having a variety of feature vectors are selected.

However, in actuality, images of a multiplicity of frames have been stored in the image database 4, and the image characteristics of these images are actually multifarious. In order to calculate feature vectors of images of such a large number of frames, a great deal of calculation is required and calculation takes a long period of time. Accordingly, in the image database according to this embodiment, a KL (Karhunen-Loéve) expansion is applied to the image data that has been stored in the image database 4, thereby reducing the number of dimensions (number of coordinate axes) of the space in which the images are placed (step 11). Since the images that have been stored in the image database 4 are disposed in space in which the number of dimensions has been reduced, the time required for calculation of feature vectors can be shortened.

The images that have undergone the KL expansion are disposed in space, after which representative images are extracted based upon the feature vectors of respective ones of the images (step 12). The representative images extracted are displayed on the display screen of the display unit 6 (step 13).

FIG. 3 illustrates the manner in which extracted representative images are displayed.

As shown in FIG. 3, a coordinate area 23 has been formed over the entire surface of a display screen 21. Ten frames of thumbnail images (representative images) Ir are displayed in the coordinate area 23. The coordinate axes of the coordinate area 23 indicate characteristics of the images. The horizontal axis of the coordinate area 23 indicates image photography date, and the vertical axis indicates image lightness. It goes without saying that other image characteristics may be used on the coordinate axes. Further, the coordinate axes need not be displayed on the display screen 21. It will suffice if the representative images Ir are displayed on the display screen 21 in distributed form in accordance with fixed image characteristics. In addition, a cursor 22 for designating a specific image is also displayed on the display screen 21.

Using the input unit 3, the user designates a representative image Ir having characteristics close to those of the required image from among the representative images Ir being displayed on the display screen 21 (step 14). More specifically, the cursor 22 is moved onto the desired representative image Ir and the image is doubled-clicked, for example, using the mouse included as part of the input unit 3, whereby the image is designated. In this embodiment, it is assumed that the user has designated a representative image Is1 in FIG. 3.

When this is done, images possessing characteristics near those of the representative image Is1 designated by the user are extracted from the image database 4 (step 15). Images of a number of frames identical with the number (ten) of frames of the representative images Ir displayed on the display screen 21 are extracted. It goes without saying that the number of frames of images extracted need not be the same. The extracted images (thumbnail images), denoted by reference characters It in FIG. 4, are displayed in the coordinate area 23 on the display screen 21 by being distributed in accordance with the characteristics thereof, as illustrated in FIG. 4 (step 16). The coordinate axes of the coordinate area 23 that displays the extracted images It are made the same as the coordinate axes of the coordinate area 23 that displays the representative images Ir (i.e., the same image characteristics are used). However, the coordinate axes used in the coordinate area 23 that displays the images It extracted based upon the selected image Is1 are more detailed than the coordinate axes used in the coordinate area 23 that displays the representative images Ir. More specifically, whereas a period from January to December and a lightness of from 0 to 7 are specified along the horizontal and vertical axes, respectively, of the coordinate area 23 shown in FIG. 3, a period from July $1^{st}$ to July $31^{st}$ and a lightness of from 3.0 to 4.0 are specified along the horizontal and vertical axes, respectively, of the coordinate area 23 shown in FIG. 4.

As shown in FIG. 4, ten frames of images having characteristics resembling those of the image Is1 selected by the user are displayed on the display screen 21. If the thumbnail image (e.g., thumbnail image Is2) of the required image is present among the images of the ten frames thus displayed, the thumbnail image of this required image is designated by the cursor 22 ("YES" at step 17: end of search). As a result, the image representing the image that corresponds to the designated thumbnail image is displayed on the display screen of the display unit 6. If a thumbnail image of the required image is not present among the images of the ten frames displayed ("NO" at step 17), then the image having the characteristics resembling those of the required image is designated again using the cursor 22. As a result, thumbnail images of ten frames of images having the characteristics of the designated image are displayed on the display screen 21. It goes without saying that the coordinate axes of the coordinate area appear in even greater detail also when the coordinate area is displayed on the display screen 21 again. For example, in a case where a thumbnail image It1 having a lightness of 3.5 and a photography date of Jul. 10, 2000 has been selected, a coordinate area having a horizontal axis covering a period of from 00:00 to 24:00 on July $10^{th}$ and a vertical axis covering a lightness of from 3.4 to 3.6 would be displayed on the display screen 21.

In the embodiment described above, a KL transform is applied to the image data and representative images are extracted from the images obtained by the KL transform. However, the KL transform need not necessarily be applied.

Further, it may be so arranged that representative images are extracted randomly and not based upon feature vectors.

Figure 5:
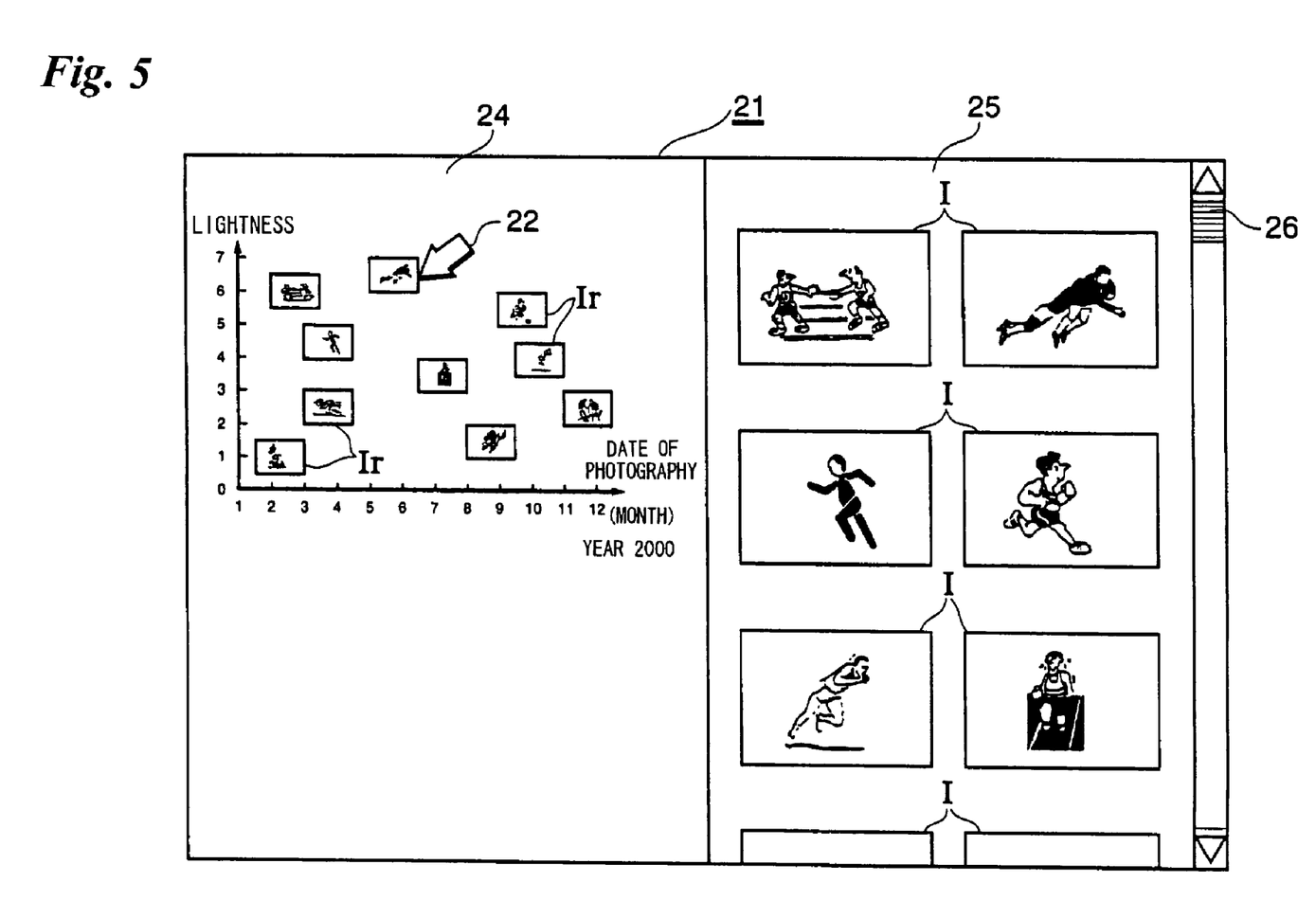

FIG. 5 illustrates an example of images displayed on the display screen 21 according to another embodiment of the present invention.

As shown in FIG. 5, the display screen 21 is split into a left-half area that serves as a coordinate area 24 and a right-half area that serves as a detailed-image display area 25.

Ten frames of thumbnail images are displayed in the coordinate area 24 by being distributed in accordance with their characteristics in the manner illustrated in FIGS. 3 and 4. Detailed images (images having a higher image quality than thumbnail images) corresponding to the thumbnail images displayed in the coordinate area 24 are displayed in the detailed-image display area 25. The right edge of the detailed-image display area 25 is provided with a scroll bar 26. By scrolling up or down using the scroll bar 26 and by employing the cursor 22, a detailed image that does not appear in the detailed-image display area 25 can be displayed in the detailed-image display area 25 from among detailed images I corresponding to the thumbnail images being displayed in the coordinate area 24.

Since detailed images are thus displayed, the user can ascertain the details of an image that are not apparent from the thumbnail image thereof.

As many apparently widely different embodiments of the present invention can be made without departing from the spirit and scope thereof, it is to be understood that the invention is not limited to the specific embodiments thereof except as defined in the appended claims.

What is claimed is:

1. An image database apparatus comprising:
   an extraction device for extracting representative image data, which represents representative images of a plurality of frames, from an image database in which image data of a number of frames has been stored;
   a first display control device for controlling a display device in such a manner that the representative images of the plurality of frames represented by the representative image data extracted by said extraction device are displayed in a two-dimensional coordinate area in a form in which they are distributed in accordance with characteristics of each of the representative images;
   a designating device for designating a desired image from among the images of the plurality of frames distributed in the two-dimensional coordinate area based upon display control performed by said first display control device;
   a search device for searching the image database for images having characteristics that resemble the characteristics of the image designated by said designating device; and
   a second display control device for controlling the display device in such a manner that retrieved images, which result from the search performed by said search device, are displayed in the two-dimensional coordinate area whose coordinates axes are more detailed than coordinate axes in the two-dimensional coordinate area in which images are displayed in a form in which they are distributed based upon display control by said first display control device, in conformity with the characteristics thereof, wherein
   the second display control device is configured to control the display device to display in the two-dimensional coordinate area, whose coordinates axes are more detailed than coordinate axes in the two-dimensional coordinate area under control of the first display control device, a number of retrieved images that result from the search performed by the search device that is equal to the number of the plurality of frames displayed in the two-dimensional coordinate area under control of the first display control device.

2. The apparatus according to claim 1, further comprising a device for performing control so as to repeat designating of images by said designating device, searching by said search device and display control by said second display control device.

3. The apparatus according to claim 1, wherein at least one of said first and second display control devices controls the display device so as to display images, in conformity with the characteristics thereof, in a coordinate area that is formed over the entire surface of one window.

4. The apparatus according to claim 1, wherein said extraction device extracts the representative image data from image data obtained by applying a Karhunen-Loéve expansion to image data representing images of a number of frames that have been stored in the image database.

5. The apparatus according to claim 1, wherein representative images represented by representative image data extracted by said extraction device are extracted randomly.

6. The apparatus according to claim 1, wherein the number of frames of representative images displayed in the coordinate area based upon display control by said first display control device and the number of frames of images displayed in the coordinate area based upon display control by said second display control device are the same.

7. A method of controlling operation of an image database apparatus, comprising the steps of:
(a) extracting representative image data, which represents representative images of a plurality of frames, from an image database in which image data of a number of frames has been stored;
(b) displaying the representative images of the plurality of frames represented by the extracted representative image data on a display device in a form in which the images are distributed in a two-dimensional coordinate area in accordance with characteristics of each of the representative images;
(c) designating an image of a desired frame from among the images of the plurality of frames distributed in the two-dimensional coordinate area;
(d) searching the image database for images having characteristics that resemble the characteristics of the image designated; and
(e) controlling the display device in such a manner that retrieved images, which result from the search, are displayed in the two-dimensional coordinate area whose coordinates axes are more detailed than coordinate axes in the two-dimensional coordinate area in which images are displayed in a form in which they are distributed based upon display control by said first display control device, in distributed form, wherein step (b) is carried out by a first display control device and step (e) is carried out by a second display control device, and the second display control device is configured to control the display device to display in the two-dimensional coordinate area, whose coordinates axes are more detailed than coordinate axes in the two-dimensional coordinate area under control of the first display control device, a number of retrieved images that result from the search performed by the search device that is equal to the number of the plurality of frames displayed in the two-dimensional coordinate area under control of the first display control device.

* * * * *